United States Patent
Wang et al.

(10) Patent No.: US 11,485,376 B2
(45) Date of Patent: Nov. 1, 2022

(54) AUTOMATIC DRIVING PROCESSING SYSTEM, SYSTEM ON CHIP AND METHOD FOR MONITORING PROCESSING MODULE

(71) Applicant: Beijing Baidu Netcom Science And Technology Co., LTD., Beijing (CN)

(72) Inventors: Chongqin Wang, Beijing (CN); Zhibiao Zhao, Beijing (CN); Hefei Zhu, Beijing (CN); Ningyi Xu, Beijing (CN); Jian Ouyang, Beijing (CN)

(73) Assignees: Beijing Baidu Netcom Science And Technology Co., Ltd., Beijing (CN); Kunlunxin Technology (Beijing) Company Limited, Beijing (CN)

( * ) Notice: Subject to any disclaimer, the term of this patent is extended or adjusted under 35 U.S.C. 154(b) by 62 days.

(21) Appl. No.: 16/711,187

(22) Filed: Dec. 11, 2019

(65) Prior Publication Data
US 2020/0353941 A1    Nov. 12, 2020

(30) Foreign Application Priority Data
May 6, 2019 (CN) .......................... 201910370612.2

(51) Int. Cl.
*B60W 50/04* (2006.01)
*B60W 50/02* (2012.01)
*B60W 50/035* (2012.01)

(52) U.S. Cl.
CPC ...... *B60W 50/045* (2013.01); *B60W 50/0205* (2013.01); *B60W 50/035* (2013.01); *B60W 2050/021* (2013.01)

(58) Field of Classification Search
CPC ........... B60W 50/045; B60W 50/0205; B60W 50/035; B60W 2050/021; B60W 60/0015;
(Continued)

(56) References Cited

U.S. PATENT DOCUMENTS 8,527,139 B1   9/2013   Yousuf
10,946,864 B2 *   3/2021   Choi ................... G06N 3/0454
(Continued)

FOREIGN PATENT DOCUMENTS

CN    206187050 U    5/2017
DE    102017210151 A1    12/2018
(Continued)

OTHER PUBLICATIONS

European Patent Office, Office Action in Application No. 19215322.9, dated Jun. 17, 2022 (8 pages).

*Primary Examiner* — Abby Y Lin
*Assistant Examiner* — Esvinder Singh
(74) *Attorney, Agent, or Firm* — Nixon Peabody LLP

(57) ABSTRACT

An automatic processing system, a system on chip and a method for monitoring a processing module are described herein. The automatic driving processing system comprises: an automatic driving processing module, configured for receiving an input data stream and processing the input data stream based on a deep learning model so as to generate a processing result; a fault detection module, configured for generating a control signal and a fault detection stimulating data stream, and receiving the processing result from the automatic driving processing module; and a multi-way selection module, configured for receiving an automatic driving data stream as well as the control signal and the fault detection stimulating data stream, and selectively outputting the automatic driving data stream or the fault detection stimulating data stream to the automatic driving processing module based on the control signal, as an input data stream.

20 Claims, 4 Drawing Sheets

(58) Field of Classification Search
CPC ............ B60W 50/04; B60W 50/14; B60W 2050/0292; B60W 20/50; B60W 50/023; B60W 50/029; B60W 60/0016; B60W 60/00186; G06F 11/3013; G06F 11/0796; G06F 11/2236; G06F 11/0751; G06F 15/7807; G06F 11/07; G06F 11/0739; G06F 11/1476; G06F 11/1629; G06F 11/1637; G06F 11/1641; G06F 11/0766; G05D 1/0088; G05D 2201/0213; G06N 3/08; G06N 3/02; B60Y 2306/15; G05B 13/027; G05B 23/0208; G05B 23/0229; G05B 23/0235; G05B 23/0243; G05B 23/0259; G05B 23/027

See application file for complete search history.

(56) References Cited

U.S. PATENT DOCUMENTS

| | | | |
|---|---|---|---|
| 2006/0241831 | A1 | 10/2006 | Watanabe et al. |
| 2012/0005535 | A1 | 1/2012 | Shigehara |
| 2012/0290186 | A1* | 11/2012 | Gau .................. B60L 3/0061 701/99 |
| 2015/0293173 | A1 | 10/2015 | Tsuboi et al. |
| 2016/0103173 | A1* | 4/2016 | Morici .............. G01R 31/006 324/750.3 |
| 2017/0277183 | A1 | 9/2017 | Takahashi et al. |
| 2018/0276546 | A1* | 9/2018 | Joshi ................ B60W 50/045 |
| 2019/0101924 | A1* | 4/2019 | Styler .............. B60W 30/0956 |
| 2019/0138423 | A1* | 5/2019 | Agerstam .......... G06F 11/3447 |
| 2019/0291748 | A1* | 9/2019 | Takahashi ......... B60W 30/18 |
| 2019/0293462 | A1* | 9/2019 | Choi ................ G06N 3/0472 |
| 2020/0082649 | A1* | 3/2020 | Lee .................. G05D 1/0088 |
| 2020/0249640 | A1* | 8/2020 | Muraleedhara ...... G05D 1/0055 |
| 2020/0320807 | A1* | 10/2020 | Gorti ............... G07C 5/0808 |
| 2021/0146938 | A1* | 5/2021 | Sari ................. G06F 11/0757 |

FOREIGN PATENT DOCUMENTS

| | | |
|---|---|---|
| EP | 1156621 A2 | 11/2001 |
| JP | 2006309716 A | 11/2006 |
| JP | 2010218277 A | 9/2010 |
| JP | 2013171348 A | 9/2013 |
| JP | 2015206785 A | 11/2015 |
| JP | 2017182771 A | 10/2017 |
| WO | 2018233889 A1 | 12/2018 |

* cited by examiner

AUTOMATIC DRIVING PROCESSING SYSTEM, SYSTEM ON CHIP AND METHOD FOR MONITORING PROCESSING MODULE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure primarily relate to the field of automatic driving and specifically to an automatic driving processing system, a system on chip including the processing system, and a method for monitoring a processing module included in the processing system.

BACKGROUND

In recent years, automatic driving related technologies have gradually emerged. The automatic driving capabilities of transportation means, especially vehicles, are increasingly expected. The safety capacity of a system is the most important performance in the automatic driving capabilities.

In an automatic driving implementation, a system on chip (SoC) has been proposed as a main control unit. The functional safety of the SoC for automatic driving plays a crucial role in the safety capacity of the system. The SoC for automatic driving typically includes a plurality of subsystems or modules. As an example, at least a portion of the plurality of modules are, for example, intellectual property (IP) cores or modules. The functional safety of the module directly affects the functional safety of the SoC for automatic driving.

Therefore, it is desirable to provide an automatic driving module with an improved functional safety or an SoC for automatic driving.

SUMMARY

According to example embodiments of the present disclosure, an automatic driving processing system, a system on chip for autonomous driving, and a method for monitoring the automatic driving processing module are provided, which can provide a system and a method with improved function safety.

In a first aspect of the present disclosure, an automatic driving processing system is provided. The system includes an automatic driving processing module, configured for receiving an input data stream and processing the input data stream based on a deep learning model so as to generate a processing result; a fault detection module, configured for generating a control signal and a fault detection stimulating data stream, and receiving the processing result from the automatic driving processing module; and a multi-way selection module, configured for receiving an automatic driving data stream as well as the control signal and the fault detection stimulating data stream from the fault detection module, and selectively outputting the automatic driving data stream or the fault detection stimulating data stream to the automatic driving processing module based on the control signal, as the input data stream of the automatic driving processing module, where the fault detection module is further configured for comparing a processing result of the fault detection stimulating data stream received from the automatic driving processing module with a predetermined result corresponding to the fault detection stimulating data stream, and determining whether a fault occurs in the automatic driving processing module in response to the comparison.

In a second aspect of the present disclosure, a system on chip for autonomous driving is provided. The system on chip includes the above described automatic driving processing system.

In a third aspect of the present disclosure, a method for monitoring an automatic driving processing module is provided. The method includes: selectively inputting an automatic driving data stream or a fault detection stimulating data stream, as an input data stream, into the automatic driving processing module based on a control signal, wherein the automatic driving processing module is configured for processing the input data stream based on a deep learning model so as to generate a processing result; receiving the processing result of the fault detection stimulating data stream from the automatic driving processing module; and comparing the processing result of the fault detection stimulating data stream with a predetermined result corresponding to the fault detection stimulating data stream, and determining whether a fault occurs in the automatic driving processing module in response to the comparison.

It should be understood that the content described in the summary section of the disclosure is not intended to limit the key or important features of the embodiments of the present disclosure, nor is it intended to limit the scope of the present disclosure. Other features of the present disclosure will become easily understood by the following description.

BRIEF DESCRIPTION OF THE DRAWINGS

With reference to the following accompanying drawings and detailed descriptions, other features, advantages and aspects of some embodiments of the present disclosure will become more apparent. In these accompanying drawings, the same or similar marks indicate the same or similar elements.

DETAILED DESCRIPTION OF EMBODIMENTS

Figure 1:
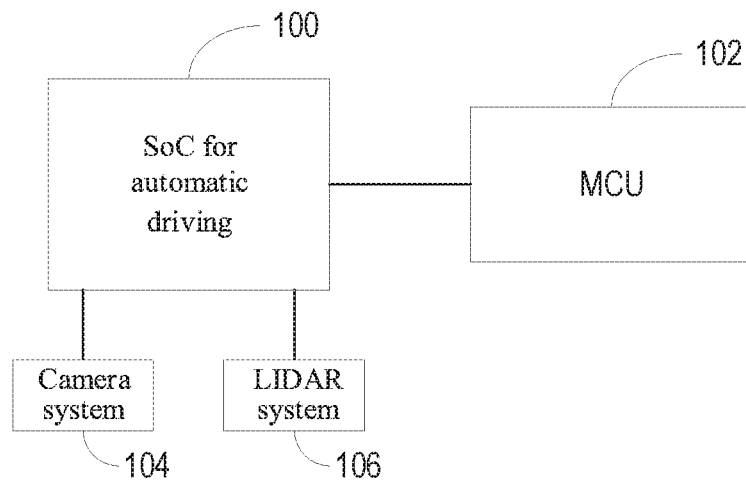
FIG. 1 is a block diagram of an example environment in which some embodiments of the present disclosure may be implemented.

The embodiments of the present disclosure will be described in more detail hereinafter with reference to the accompanying drawings. Although some embodiments of the present disclosure are shown in the accompanying drawings, it should be understood that the present disclosure may be embodied in various forms and should not be construed as limited to the embodiments set forth herein. On the contrary, these embodiments are provided to make the present disclosure more thorough and complete. The accompanying drawings and embodiments of the present disclosure are to be considered as illustrative only but not limiting the scope of protection of the present disclosure.

In the description of some embodiments of the present disclosure, the term "including" and the like should be understood as open terms, i.e., "including but not limited to". The term "based on" should be understood as "at least partially based on." The term "an embodiment" or "the present embodiment" should be understood as "at least one embodiment." The terms "first," "second" and the like may refer to different or identical objects. Other explicit and implicit definitions may also be included below.

As mentioned above, the functional safety of an SoC for automatic driving plays a key role in the safety of an automatic driving system. The SoC for automatic driving generally include an automatic driving module that processes data based on a deep learning model and may also be referred to as an artificial intelligence (AI) module. Since an AI algorithm is applied more and more in automatic driving sensing, planning and control, the requirements thereof for large computing power and low latency pose challenges to the safety of a traditional chip function.

Conventional schemes such as logic built-in self-test (LBIST) and error checking and correction (ECC) are used in an automatic driving module to ensure functional safety. The system safety capacities of such scheme generally reach an Automotive Safety Integration Level (ASIL) B. However, it is desirable to further increase the ASIL level of automatic driving without affecting the requirements of the automatic driving module for high computing power, low latency and the like. In addition, it is desirable to take a safety measure for ensuring the functional safety of the entire SoC for automatic driving. Such safety measure may need to cover hardware and software errors of the SoC for automatic driving and also cover AI algorithm deficiencies, so as to further improve the safety capacity of the system.

According to an embodiment of the present disclosure, an automatic driving processing system with an improved functional safety is provided, and the automatic driving processing system is included in an SoC for automatic driving as a subsystem of the SoC for automatic driving. In the automatic driving processing system, a multi-way selection module is configured for receiving an automatic driving data stream as well as a control signal and a fault detection stimulating data stream from a fault detection module, and selectively outputting one of the automatic driving data stream and the fault detection stimulating data stream to the automatic driving processing module based on the control signal. The automatic driving processing module is configured for processing one of the received automatic driving data stream and the received fault detection stimulating data stream based on a deep learning model so as to generate a processing result; and the fault detection module is configured for comparing a processing result of the fault detection stimulating data stream received from the automatic driving processing module with a predetermined result corresponding to the fault detection stimulating data stream, and determining whether a fault occurs in the automatic driving processing module. In this way, whether a fault occurs in the automatic driving processing module may be determined by a less complicated detection scheme without affecting the requirements of the automatic driving processing module for high computing power, low latency and the like. Hence, the data processing speed and the safe processing speed of the automatic driving processing system may be increased, thereby obtaining an SoC for automatic driving that ensures function safety and has an increased processing speed.

FIG. 1 shows a schematic diagram of an example environment in which some embodiments of the present disclosure may be implemented. In some embodiments, the example environment may be a vehicle. Referring to FIG. 1, the example environment may include an SoC 100 for automatic driving, a micro control unit (MCU) 102, a camera system 104, and a light detection and ranging (LIDAR) system 106.

The SoC 100 for automatic driving is a main control unit for automatic driving. The SoC 100 for automatic driving may receive image data from the camera system 104 and receive LIDAR data from the LIDAR system 106. The SoC 100 for automatic driving may use sensing data received from a vehicle as an automatic driving data stream and processing the automatic driving data stream. The SoC 100 for automatic driving may process received data at least partially based on a deep learning model to generate processing information. The SoC 100 for automatic driving may send the processing information to the MCU 102.

The MCU 102 is an auxiliary control unit for automatic driving. The MCU 102 may control various components of the vehicle based on the received processing information. The MCU 102 may receive status information from the various components of the vehicle, and the MCU 102 may generate a control signal based on the status information so as to control the various components of the vehicle, or may request the SoC 100 for automatic driving to process a status signal so as to generate a control signal, thus controlling the various components of the vehicle.

It should be understood that the example environment shown in FIG. 1 may further include other sensing systems and interface systems that are electrically coupled to the SoC 100 for automatic driving and/or the MCU 102. The SoC 100 for automatic driving may receive input signals from at least a portion of the other sensing systems and interface systems, and process such input signals. The MCU 102 may also receive input signals from at least a portion of the other sensing systems and interface systems, and process such input signals.

Example embodiments of the present disclosure will be described in detail below with reference to the accompanying drawings.

Figure 2:
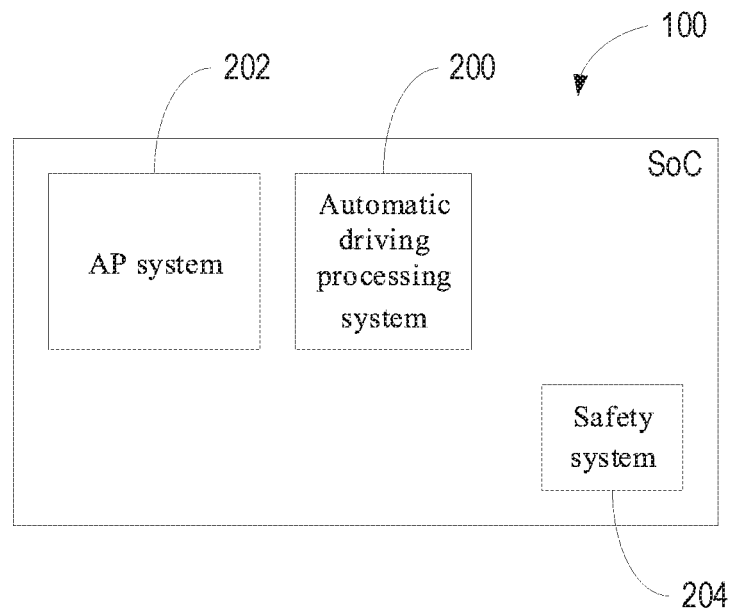
FIG. 2 is a block diagram of an SoC for automatic driving according to an embodiment of the present disclosure.

FIG. 2 shows a block diagram of an SoC for automatic driving according to an embodiment of the present disclosure. Referring to FIG. 2, the SoC 100 for automatic driving may include an automatic driving processing system 200. In some embodiments, the automatic driving processing system 200 is configured for processing input data at least partially based on an AI algorithm, so as to generate a processing result. In some embodiments, the automatic driving processing system 200 is configured as an AI subsystem of the SoC 100 for automatic driving. In some embodiments, the automatic driving processing system 200 is configured for processing the input data at least partially based on a deep learning model so as to generate a processing result. In some embodiments, the automatic driving processing system 200 is configured for receiving at least a portion of the automatic driving data stream from the camera system 104 and/or the LIDAR system 106 as shown in FIG. 1. The automatic driving processing system 200 according to an embodiment of the present disclosure will be described in further detail later with reference to FIG. 3.

Referring to FIG. 2, the SoC 100 for automatic driving, in some embodiments, further includes an application processing (AP) system 202 which may include a central processing unit (CPU). In some embodiments, the AP system 202 is configured for receiving the processing result from the automatic driving processing system 200 and processing the processing result so as to generate application processing information. In some embodiments, the SoC 100 for automatic driving sends the application processing information to the MCU 102 as shown in FIG. 1 so as to generate control signals for controlling various components of a vehicle. In some embodiments, the AP system 202 is configured for receiving signals from other subsystems included in the SoC 100 for automatic driving and processing the received signals.

Referring to FIG. 2, the SoC 100 for automatic driving, in some embodiments, further includes a safety system 204 that may be disposed separately and independently from the automatic driving processing system 200 and the AP system 202. In some embodiments, the safety system 204 is configured for receiving an alarm signal from the automatic driving processing system 200 and performing a predetermined processing based on the alarm signal. In some embodiments, the predetermined processing includes alarming a user, initializing the automatic driving processing system 200, and enabling a redundant system. In some embodiments, the safety system 204 is configured for receiving an internal signal generated within the SoC 100 for automatic driving and determining whether the internal signal conforms to a normal standard. In some embodiments, the safety system 204 is configured for receiving application processing information output from the SoC 100 for automatic driving and determining whether the application processing information conforms to the normal standard. In some embodiments, the safety system 204 is configured for performing a safety processing in response to non-conforming to the normal standard, the processing including reducing the speed of the vehicle, traveling along an open road, restarting the system, and enabling the redundant system.

In some embodiments, the AP system 202 includes a checking module. In some embodiments, the safety system 204 includes a checking module. In some embodiments, the checking module is configured for receiving a processing result from the automatic driving processing system 200 and determining whether the processing result conforms to a predetermined safety standard. In some embodiments, the checking module is configured for performing a safety processing in response to the determining that the processing result does not conform to the predetermined safety standard. In such case, the automatic driving processing system 200 is configured as a doer, and the checking module is configured as a checker. In some embodiments, the checking module is configured for receiving the application processing information from the AP system 202 and determining whether the application processing information conforms to the predetermined safety standard. In some embodiments, the checking module is configured for performing a safety processing in response to the determining that the application processing information does not conform to the predetermined safety standard. In such case, the AP system 202 is configured as a doer, and the checking module is configured as a checker. In some embodiments, the determining of conforming to the predetermined safety standard includes determining whether the vehicle is in a hazardous scenario, for example, the vehicle will suffer from a collision, and the vehicle is driving on a wrong road. In some embodiments, the checking module is configured for performing an emergency processing in response to the determining that the vehicle is in a hazardous scenario. In some embodiments, the performing an emergency processing includes braking the vehicle emergently, and stopping the vehicle by the side.

In some embodiments, the checking module, as checker, is configured for determining whether an operation of the doer conforms to the predetermined safety standard. In some embodiments, the checking module is configured for performing an emergency processing in response to the determining that the operation of the doer does not conform to the predetermined safety standard. In some embodiments, the checking module is configured for performing an emergency processing such that the SoC 100 for automatic driving enters a safe mode. In some embodiments, the checking module is configured for inhibiting the application processing information from the AP system 202 from being output from the SoC 100 for automatic driving in the safe mode. In some embodiments, the checking module is configured for outputting safe mode information as an output of the SoC 100 for automatic driving in the safe mode.

In some embodiments, the automatic driving processing system 200 is configured as a doer, and the checking module included in the AP system 202 or the safety system 204 is configured as a checker. In some embodiments, the AP system 202 is configured as a doer and the checking module included in the safety system 204 is configured as a checker. The doer is configured for performing an algorithm for the SoC 100 for automatic driving. As an example, the doer is configured for performing an AI algorithm. The checker is configured for checking a hazard scenario, for example, the vehicle will suffer from a collision, and the vehicle is driving on a wrong road. In response to the determining that the vehicle is in the hazardous scenario, the checker takes over an operation of the SoC for automatic driving and performs emergency operations such as emergency braking of the vehicle and stopping of the vehicle by the side while disabling the operation of the doer. In this way, the checker may compensate for a damage caused by doer's mistake, such as hardware and software errors and AI algorithm errors. In addition, in this way, policies of the doer and checker allow the safety level of the doer to be lower, thus reducing the design complexity and cost of the doer, and allowing the safety level of the SoC for automatic driving to reach a high standard by configuring an independent redundant checker with a high safety level. As an example, the safety level of the checker may reach an ASIL D. In this way, the checker may compensate for deficiencies in the SoC for automatic driving, such as deficiencies in expected functional safety requirements and AI algorithms, so that the safety capacity of the of SoC for automatic driving reaches the ASIL D.

It should be understood that the AP system 202 and/or the safety system 204 may be further configured for performing other signal processing as is known in the art. Moreover, the SoC 100 for automatic driving, in some embodiments, may further include other subsystems. In some embodiments, the other subsystems include a memory control system, an audio processing system, an image processing system, and an input and output system.

According to an embodiment of the present disclosure, the automatic driving processing system 200 may be of a redundancy mechanism. In some embodiments, the SoC 100 for automatic driving further includes a redundant automatic driving processing system. The redundant automatic driving processing system is configured for receiving an automatic driving data stream and processing the automatic driving data stream based on a deep learning model so as to generate a redundant processing result. In this way, when it is determined that the automatic driving processing system 200 fails, the redundant automatic driving processing system is enabled in response to a corresponding alarm signal so as to continue the processing for automatic driving. Hence, the safety capacity of the system for automatic driving of the vehicle is improved.

Figure 3:
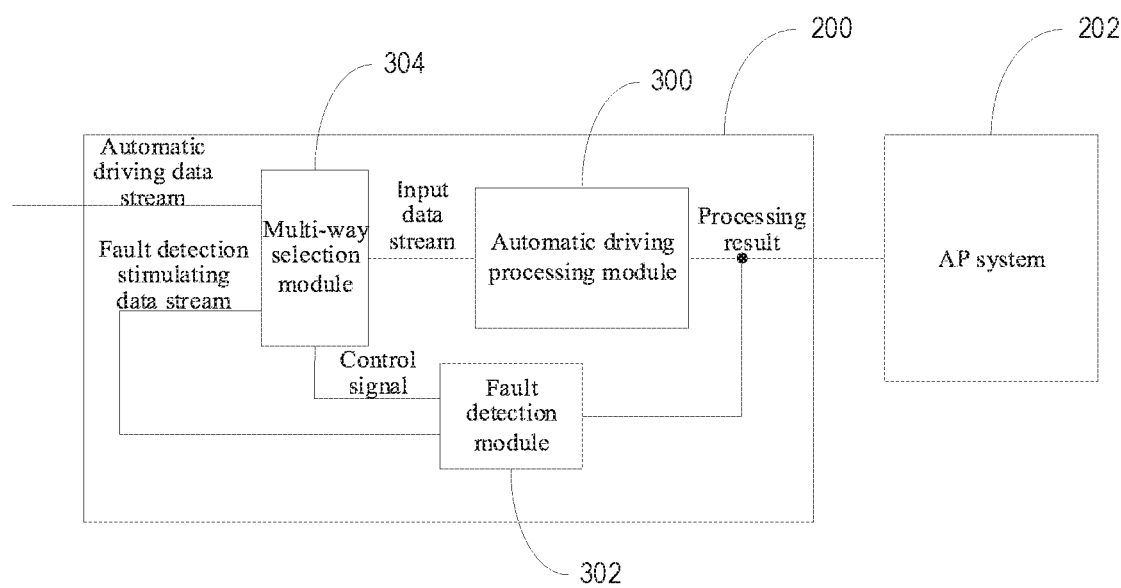
FIG. 3 is a block diagram of an automatic driving processing system according to an embodiment of the present disclosure.

FIG. 3 shows a block diagram of an automatic driving processing system according to an embodiment of the present disclosure. Referring to FIG. 3, the automatic driving processing system 200 includes an automatic driving processing module 300, a fault detection module 302 and a multi-way selection module 304. In some embodiments, a processing result output by the automatic driving processing module 300 is transmitted to an AP system 202 as shown in FIG. 2 for processing therein.

The automatic driving processing module 300 is configured for receiving an input data stream and processing the input data stream based on a deep learning model so as to generate a processing result. In some embodiments, the automatic driving processing module 300 is an AI module for automatic driving. In some embodiments, the module, for example, is an IP core of an SoC. In some embodiments, the automatic driving processing module 300 is configured for performing at least a portion of automatic driving sensing, planning and control processing at least partially based on an AI algorithm, so as to generate processing results of at least a portion of the sensing, planning and control processing. In some embodiments, the automatic driving processing module 300 outputs a processing result of at least one of obstacle recognition, environment identification, driving information, route selection, vehicle status information and the like. In some embodiments, the automatic driving processing module 300 may be an AI module of an SoC for automatic driving as is known in the art.

The fault detection module 302 is configured for generating a control signal and a fault detection stimulating data stream, and receiving the processing result from the automatic driving processing module 300. In some embodiments, the fault detection module 302 and the automatic driving processing module 300 are separately disposed in the automatic driving processing system 200, as shown in FIG. 3. It should be understood that the present embodiment of the present disclosure is not limited thereto, and in other embodiments, the fault detection module 302 is included in the automatic driving processing module 300 and operates independently of the deep learning model of the automatic driving processing module 300, so that the automatic driving processing module 300 outputs the control signal and the fault detection stimulating data stream besides the processing result.

The multi-way selection module 304 is configured for receiving an automatic driving data stream as well as the control signal and the fault detection stimulating data stream from the fault detection module 302, and selectively outputting the automatic driving data stream or the fault detection stimulating data stream to the automatic driving processing module 300 based on the control signal, as an input data stream of the automatic driving processing module 300. In some embodiments, the multi-way selection module 304 receives the automatic driving data stream from a camera system 104 and/or an LIDAR system 106 as shown in FIG. 1. In some embodiments, the multi-way selection module 304 is further configured for outputting the automatic driving data stream to the automatic driving processing module 300 as the input data stream when the control signal has a first logic level, and outputting the fault detection stimulating data stream to the automatic driving processing module 300 as the input data stream when the control signal has a second logic level different from the first logic level. In some embodiments, the multi-way selection module 304 is further configured for receiving other types of control signals, for example, control signals for enabling or disabling the multi-way selection module 304 and control signals for changing the frequency of output and input data streams.

In some embodiments, during a normal data stream processing, the automatic driving processing module 300 is configured for receiving the automatic driving data stream so as to generate a processing result of the automatic driving data stream. In some embodiments, during a fault detection process, the automatic driving processing module 300 is configured for receiving the fault detection stimulating data stream so as to generate a processing result of the fault detection stimulating data stream.

The fault detection module 302 is further configured for comparing the processing result of the fault detection stimulating data stream received from the automatic driving processing module 300 with a predetermined result corresponding to the fault detection stimulating data stream, and determining whether a fault occurs in the automatic driving processing module 300 in response to the comparison. In some embodiments, the fault detection module 302 associatively stores at least one fault detection stimulating data stream and at least one predetermined result corresponding thereto in a memory. In some embodiments, the fault detection module 302 is configured for determine at least one predetermined result corresponding to the output fault detection stimulating data stream by a lookup table. In some embodiments, the predetermined result includes a processing result of at least a portion of automatic driving sensing, planning and control processing.

In some embodiments, the fault detection module 302 is further configured for determining no fault occurring in the automatic driving processing module 300 in response to a difference between the processing result of the fault detection stimulating data stream and the predetermined result being within a predetermined range. In some embodiments, the fault detection module 302 is further configured for generating the control signal in response to the determining that no fault occurs in the automatic driving processing module 300, such that the multi-way selection module 304 outputs the automatic driving data stream to the automatic driving processing module 300 based on the control signal. In some embodiments, the fault detection module 302 is further configured for determining a fault occurring in the automatic driving processing module 300 in response to a difference between the processing result of the fault detection stimulating data stream and the predetermined result exceeding the predetermined range, and generating an alarm signal. In some embodiments, the alarm signal is transmitted to a safety system 204 as shown in FIG. 2.

In some embodiments, the processing result of the fault detection stimulating data stream is compared to a set of predetermined results so as to determine whether the processing result of the fault detection stimulating data stream conforms to at least one predetermined result in the set. In some embodiments, the processing result of the fault detection stimulating data stream is compared to the at least one predetermined result so as to determine the correlation of a feature of the processing result of the fault detection stimulating data stream to a feature of the at least one predetermined result. It should be understood that the processing result and the predetermined result of the fault detection stimulating data stream may be compared using a method known in the art.

In the automatic driving processing system 200 according to an embodiment of the present disclosure, one of the automatic driving data flow and the fault detection stimulating data stream is input into the automatic driving processing module 300 so as to generate a processing result of the input data stream. In this way, there is no need to change the existing or designed automatic driving processing module 300, for example, an AI module of an SoC for automatic driving. Further, the fault detection stimulating data stream is inserted between adjacent data streams in a series of automatic driving data streams based on the selection of the control signal, for the automatic driving processing module 300 to process. In this way, the processing load of the automatic driving processing module is not increased, a complicated operation of the automatic driving processing module is not caused, and the design complexity of the automatic driving processing module is reduced. Further, for the automatic driving processing module 300, the fault detection module 302 is independently arranged in the same subsystem of the SoC for automatic driving, such as an automatic driving processing system 200. In this way, hardware and software faults of the automatic driving processing module may be determined independently and quickly, and the safety capacity of the automatic driving processing module may be increased. Hence, compared to the SOC that using the safety measures LBIST and ECC to reach the ASIL B, the SoC for automatic driving according to some embodiments of the present disclosure may achieve the ASIL D so as to improve the safety capacity of the system for automatic driving of the vehicle.

According to some embodiments of the present disclosure, a redundancy mechanism may be used for the automatic driving processing module 300. In some embodiments, the automatic driving processing system 200 further includes a redundant automatic driving processing module. The redundant automatic driving processing module is configured for receiving an input data stream and processing the input data stream based on a deep learning model so as to generate a redundant processing result. In this way, when it is determined that the automatic driving processing module 300 fails, the redundant automatic driving processing system is enabled in response to a corresponding alarm signal so as to continue the processing for automatic driving. Hence, the safety capacity of the system for automatic driving of the vehicle is improved.

Figure 4:
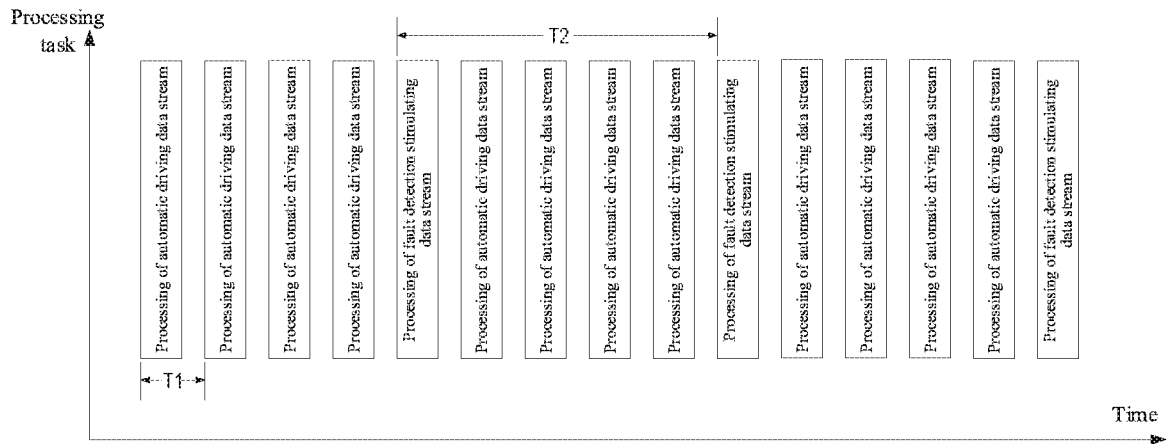
FIG. 4 is a schematic diagram of a processing task of an automatic driving processing module according to an embodiment of the present disclosure.

FIG. 4 shows a schematic diagram of a processing task of an automatic driving processing module according to an embodiment of the present disclosure. Referring to FIG. 4, in a process of processing an input data stream within a cycle T1 by an automatic driving processing module 300, the automatic driving processing module 300 processes a fault detection stimulating data stream periodically or within a cycle T2. In this way, the functional safety of the automatic driving processing module 300 may be ensured.

In some embodiments, the fault detection module 302 is further configured for generating a control signal and a fault detection stimulating data stream within a first cycle, such that a multi-way selection module 304 outputs the fault detection stimulating data stream to the automatic driving processing module 300 based on the control signal within a cycle corresponding to the first cycle, so as to receive a processing result of the fault detection stimulating data stream from the automatic driving processing module 300. In some embodiments, the cycle is equal to the first cycle. In such case, the first cycle is equal to the cycle T2 shown in FIG. 4. In an alternate embodiment, the cycle is a fraction or multiple of the first cycle. In this way, the fault detection module 302 may periodically monitor whether a fault occurs in the automatic driving processing module 300.

In some embodiments, the multi-way selection module 304 is further configured for receiving an automatic driving data stream from the outside within a second cycle, the second cycle being shorter than the first cycle. In some embodiments, the second cycle is equal to the fraction of the first cycle. In some embodiments, the multi-way selection module 304 outputs the automatic driving data stream to the automatic driving processing module 300 within a cycle corresponding to the second cycle. In some embodiments, the cycle is equal to the second cycle. In such case, the second cycle is equal to the cycle T1 shown in FIG. 4. In this way, depending on a particular scenario, the first cycle is adjusted so that the automatic driving processing module 300 primarily processes the automatic driving data stream so as not to affect the automatic driving of the vehicle. In some embodiments, the second cycle is equal to one-fifth of the first cycle such that, for the input data stream of the automatic driving processing module 300, one fault detection stimulating data stream is inserted into every four automatic driving data streams, so as to replace a fifth automatic driving data stream with the fault detection stimulating data stream as an input data stream, as shown in FIG. 4.

It should be understood that the present embodiment of the present disclosure is not limited thereto. In other embodiments, the score may be set as other values, such that, for the input data stream of the automatic driving processing module 300, one automatic driving data stream is inserted into every one or more automatic driving data streams, that is, in a processing task of the automatic driving processing module 300, a processing task of the fault detection stimulating data stream is inserted into the processing tasks of the one or more automatic driving data streams.

In some embodiments, the fault detection module 302 outputs such fault detection stimulating data stream, such that a difference between a predetermined result corresponding to the fault detection stimulating data stream and the processing result of the previously received automatic driving data stream is within a predetermined range. In some embodiments, the predetermined result corresponding to the fault detection stimulating data stream to be output conforms to the processing result of the previously received automatic driving data stream. Hence, no abnormal value is included in the processing result received by an AP system 202. In an alternate embodiment, the fault detection module 302 outputs such fault detection stimulating data stream such that the predetermined result corresponding to the fault detection stimulating data stream includes a mark, the mark prevent the AP system 202 to process a predetermined result of the fault detection stimulating data stream. Hence, an insertion fault detection for the automatic driving processing module 300 does not affect an information processing by the AP system 202.

Figure 5:
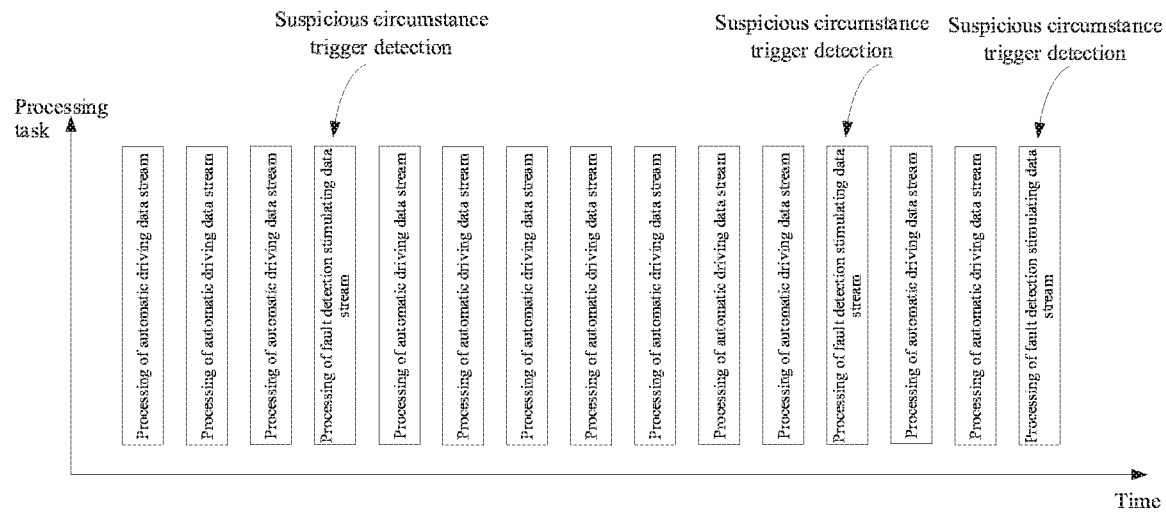
FIG. 5 is a schematic diagram of a processing task of an automatic driving processing module according to an embodiment of the present disclosure.

FIG. 5 shows a schematic diagram of a processing task of an automatic driving processing module according to an embodiment of the present disclosure. Referring to FIG. 5, in a process that the automatic driving processing module 300 processes an input data stream, under a predetermined condition, the automatic driving processing module 300 processes a fault detection stimulating data stream inserted for replacing an automatic driving data stream. In some embodiments, a detection is triggered in a suspicious circumstance, such that the automatic driving processing module 300 processes the fault detection stimulating data stream, as shown in FIG. 5. Hence, it is possible to compensate for a malfunction or a defect of the automatic driving processing module 300 in the shortest time.

In some embodiments, the fault detection module 302 is further configured for receiving a processing result of the automatic driving data stream from the automatic driving processing module 300 and determining whether the processing result exceeds a threshold. In some embodiments, the threshold is a value that deviates from a corresponding feature value of the processing result of the automatic driving data stream in a previous cycle. In some embodiments, the fault detection module 302 is configured for: generating a control signal and a fault detection stimulating data stream in response to the determining that a fluctuation of the processing result of the automatic driving data stream exceeds a threshold, such that a multi-way selection module 304 outputs the fault detection stimulating data to the automatic driving processing module 300 based on the control signal; and receiving the processing result of the fault detection stimulating data stream from the automatic driving processing module 300.

As shown in FIG. 5, in a processing task of the automatic driving processing module 300, the fault detection module 302 finds a suspicious condition in which a fluctuation exceeds a threshold after the processing tasks of first three automatic driving data streams within a time range shown, and inserts a processing task of the fault detection stimulating data stream into such processing tasks. After the fault detection module 302 determines that no fault occurs, the automatic driving processing module 300 continues to perform the processing tasks of seven automatic driving data streams. The fault detection module 302 then finds a suspicious condition in which the fluctuation exceeds the threshold and inserts the processing task of the fault detection stimulating data stream into such processing tasks. After the fault detection module 302 determines that no fault occurs, the automatic driving processing module 300 continues to perform the processing tasks of two automatic driving data streams, and then the fault detection module 302 inserts the processing task of the fault detection stimulating data stream into such processing tasks. It should be understood that the values above are merely exemplary but not limiting, and such values may vary depending on the actual situation. In this way, the fault detection module 302 may monitor the processing results of the automatic driving data stream in real time and initiate a fault detection for the automatic driving processing module 300 in a suspicious circumstance, and then finds a fault quickly so as to handle such fault for a longer time, which improves the safety capacity of the system for automatic driving.

Figure 6:
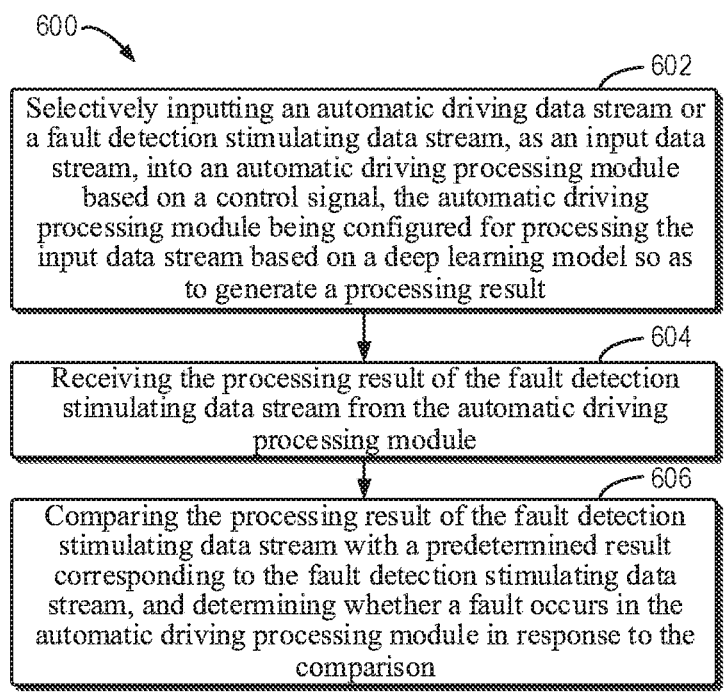
FIG. 6 shows a flowchart of a method for monitoring an automatic driving processing module according to an embodiment of the present disclosure.

FIG. 6 shows a flowchart of a method for monitoring an automatic driving processing module according to an embodiment of the present disclosure. The automatic driving processing module is the automatic driving processing module 300 described above.

Referring to FIG. 6, at a block 602, an automatic driving data stream or a fault detection stimulating data stream, as an input data stream, is selectively input into the automatic driving processing module based on a control signal, where the automatic driving processing module is configured for processing the input data stream based on a deep learning model so as to generate a processing result. In some embodiments, during a normal data stream processing, the control signal is set such that the automatic driving data stream is input into the automatic driving processing module as the input data stream, so as to generate a processing result of the automatic driving data stream. In some embodiments, during a fault detection processing, the control signal is set such that the fault detection stimulating data stream is input into the automatic driving processing module as the input data stream, so as to generate a processing result of the fault detection stimulating data stream.

At a block 604, the processing result of the automatic driving data stream is received from the automatic driving processing module. In some embodiments, the processing result of the automatic driving data stream is also received from the automatic driving processing module.

At a block 606, the processing result of the fault detection stimulating data stream is compared with a predetermined result corresponding to the fault detection stimulating data stream, and whether a fault occurs in the automatic driving processing module is determined in response to the comparison. In some embodiments, the determining whether a fault occurs in the automatic driving processing module includes: determining no fault occurring in the automatic driving processing module in response to a difference between the processing result of the fault detection stimulating data stream and the predetermined result being within a predetermined range; and determining a fault occurring in the automatic driving processing module in response to the difference exceeding the predetermined range.

In some embodiments, the control signal is set periodically such that the fault detection stimulating data stream is input into the automatic driving processing module, so as to generate a processing result of the fault detection stimulating data stream. In some embodiments, the processing result of the automatic driving data stream is received from the automatic driving processing module, and whether a fluctuation in the processing result of the automatic driving data stream exceeds a threshold is determined. In some embodiments, the control signal is set in response to the determining that a fluctuation of the processing result of the automatic driving data stream exceeds a threshold, such that the fault detection stimulating data stream is input into the automatic driving processing module so as to generate the processing result of the fault detection stimulating data.

It should be understood that the method for implementing some embodiments of the present disclosure may be written in any combination of one or more programming languages, so as to apply to an SoC architecture. In addition, while operations are depicted in a particular order, it should be understood as requiring such operations be performed in the particular order shown or in a sequential order, or that all shown operations be performed to achieve desired results. Multitasking and parallel processing may be advantageous in certain circumstances.

While several specific implementation details are contained in the discussions above, such details should not be construed as limitations on the scope of the present disclosure. Certain features that are describe in the context of separate implementations may also be implemented in combination in a single implementation. Conversely, various features that are described in the context of a single implementation may also be implemented in multiple implementations separately or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. An automatic driving processing system comprising:

at least one processor; and a storage apparatus storing modules and instructions, wherein the instructions when executed by the at least one processor, cause the at least one processor to perform operations of the stored modules, the stored modules comprising:

an automatic driving processing module, configured for receiving an input data stream and processing the input data stream based on a deep learning model so as to generate a processing result;

a fault detection module, configured for generating a control signal and a fault detection stimulating data stream within a first cycle, and receiving the processing result from the automatic driving processing module and a processing result of the fault detection stimulating data stream from the automatic driving processing module; and a multi-way selection module, configured for receiving an automatic driving data stream within a second cycle as well as the control signal and the fault detection stimulating data stream from the fault detection module, outputting the automatic driving data stream based on the control signal within a cycle corresponding to the first cycle, and outputting the fault detection stimulating data stream to the automatic driving processing module within a cycle corresponding to the second cycle, as the input data stream of the automatic driving processing module, the second cycle being shorter than the first cycle, wherein the fault detection module is further configured for comparing a processing result of the fault detection stimulating data stream received from the automatic driving processing module with a predetermined result corresponding to the fault detection stimulating data stream, and determining whether a fault occurs in the automatic driving processing module in response to the comparison, and wherein the fault detection stimulating data stream output by the fault detection module is such a data stream that a difference between the predetermined result corresponding to the fault detection stimulating data stream and a processing result of an automatic driving data stream previous to the fault detection stimulating data stream is within a predetermined range.

2. The automatic driving processing system according to claim 1, wherein the fault detection module is further configured for:

determining no fault occurring in the automatic driving processing module in response to a difference between the processing result of the fault detection stimulating data stream and the predetermined result being within a predetermined range.

3. The automatic driving processing system according to claim 2, wherein the fault detection module is further configured for:

generating the control signal in response to the determining that no fault occurs in the automatic driving processing module, such that the multi-way selection module outputs the automatic driving data stream to the automatic driving processing module based on the control signal.

4. The automatic driving processing system according to claim 1, wherein the fault detection module is further configured for:

determining a fault occurring in the automatic driving processing module in response to a difference between the processing result of the fault detection stimulating data stream and the predetermined result being within a predetermined range; and generating an alarm signal.

5. The automatic driving processing system according to claim 1, wherein the fault detection module is further configured for:

receiving from the automatic driving processing module a processing result of the automatic driving data stream;

generating the control signal and the fault detection stimulating data stream in response to the determining that a fluctuation of the processing result of the automatic driving data stream exceeds a threshold, such that the multi-way selection module outputs the fault detection stimulating data to the automatic driving processing module based on the control signal; and receiving the processing result of the fault detection stimulating data stream from the automatic driving processing module.

6. The automatic driving processing system according to claim 1, wherein the multi-way selection module is further configured for:

outputting the automatic driving data stream to the automatic driving processing module as the input data stream when the control signal has a first logic level; and outputting the fault detection stimulating data stream to the automatic driving processing module as the input data stream when the control signal has a second logic level different from the first logic level.

7. The automatic driving processing system according to claim 1, wherein the processing result for the automatic driving data stream is output to an application system for generating application processing information, and the predetermined result corresponding to the fault detection stimulating data stream comprises a mark which prevents the application system to generate application processing information for the fault detection stimulating data stream.

8. The automatic driving processing system according to claim 1, wherein, comparing a processing result of the fault detection stimulating data stream received from the automatic driving processing module with a predetermined result corresponding to the fault detection stimulating data stream, comprises:

comparing the processing result of the fault detection stimulating data stream to at least one predetermined result so as to determine a correlation of a feature of the processing result of the fault detection stimulating data stream to a feature of the at least one predetermined result, so as to determine whether a fault occurs in the automatic driving processing module based on the correlation.

9. The automatic driving processing system according to claim 1, the fault detection module is further configured for:

receiving a processing result of the automatic driving data stream from the automatic driving processing module and determining whether the processing result exceeds a threshold that is a value deviating from a corresponding feature value of the processing result of the automatic driving data stream in a previous cycle;

generating the control signal and the fault detection stimulating data stream in response to determining that the processing result exceeds the threshold, such that the multi-way selection module outputs the fault detection stimulating data to the automatic driving processing module based on the control signal; and receiving the processing result of the fault detection stimulating data stream from the automatic driving processing module.

10. A system on chip for automatic driving, comprising: an automatic driving processing system, wherein the automatic driving processing system comprises:

at least one processor; and a storage apparatus storing modules and instructions, wherein the instructions when executed by the at least one processor, cause the at least one processor to perform operations of the stored modules, the stored modules comprising:

an automatic driving processing module, configured for receiving an input data stream and processing the input data stream based on a deep learning model so as to generate a processing result;

a fault detection module, configured for generating a control signal and a fault detection stimulating data stream within a first cycle, and receiving the processing result from the automatic driving processing module and a processing result of the fault detection stimulating data stream from the automatic driving processing module; and a multi-way selection module, configured for receiving an automatic driving data stream within a second cycle as well as the control signal and the fault detection stimulating data stream from the fault detection module, outputting the automatic driving data stream based on the control signal within a cycle corresponding to the first cycle, and outputting the fault detection stimulating data stream to the automatic driving processing module, as the input data stream of the automatic driving processing module, the second cycle being shorter than the first cycle, wherein the fault detection module is further configured for comparing a processing result of the fault detection stimulating data stream received from the automatic driving processing module with a predetermined result corresponding to the fault detection stimulating data stream, and determining whether a fault occurs in the automatic driving processing module in response to the comparison, and wherein the fault detection stimulating data stream output by the fault detection module is such a data stream that a difference between the predetermined result corresponding to the fault detection stimulating data stream and a processing result of an automatic driving data stream previous to the fault detection stimulating data stream is within a predetermined range.

11. The system on chip according to claim 10, further comprising an application processing system, wherein the instructions when executed by the at least one processor, cause the at least one processor to perform operations of the applications processing system, the application processing system being configured for receiving the processing result from the automatic driving processing module of the automatic driving processing system and processing the processing result so as to generate application processing information.

12. The system on chip according to claim 11, wherein the application processing system comprises a checking module, configured for receiving the processing result from the automatic driving processing module of the automatic driving processing system, and performing a safety processing in response to the processing result not conforming to a predetermined standard.

13. The system on chip according to claim 10, further comprising a safety system, wherein the instructions when executed by the at least one processor, cause the at least one processor to perform operations of the safety system:

the safety system being configured for receiving an alarm signal from the fault detection module of the automatic driving processing system and performing a predetermined processing based on the alarm signal.

14. The system on chip according to claim 13, wherein the safety system further comprises a checking module, configured for receiving the processing result from the automatic driving processing module of the automatic driving processing system and performing a safety processing in response to the processing result not conforming to a predetermined criterion.

15. The system on chip according to claim 10, wherein the stored modules further comprise:

a redundant automatic driving processing module, configured for receiving the automatic driving data stream and processing the automatic driving data stream based on the deep learning model to generate a redundant processing result.

16. A method for monitoring an automatic driving processing module, comprising:

inputting an automatic driving data stream based on a control signal within a cycle corresponding to a first cycle and inputting a fault detection stimulating data stream within a cycle corresponding to a second cycle, as an input data stream, into the automatic driving processing module, wherein the automatic driving processing module is configured for processing the input data stream based on a deep learning model so as to generate a processing result, the second cycle being shorter than the first cycle;

receiving the processing result of the fault detection stimulating data stream from the automatic driving processing module; and comparing the processing result of the fault detection stimulating data stream with a predetermined result corresponding to the fault detection stimulating data stream, and determining whether a fault occurs in the automatic driving processing module in response to the comparison, wherein the fault detection stimulating data stream output is such a data stream that a difference between the predetermined result corresponding to the fault detection stimulating data stream and a processing result of an automatic driving data stream previous to the fault detection stimulating data stream is within a predetermined range.

17. The method according to claim 16, wherein the determining whether a fault occurs in the automatic driving processing module comprises:

determining no fault occurring in the automatic driving processing module in response to a difference between the processing result of the fault detection stimulating data stream and the predetermined result being within a predetermined range; and determining a fault occurring in the automatic driving processing module in response to the difference exceeding the predetermined range.

18. The method according to claim 16, wherein during a normal data stream processing, the control signal is set such that the automatic driving data stream is input into the automatic driving processing module as the input data stream, so as to generate a processing result of the automatic driving data stream; and during a fault detection processing, the control signal is set such that the fault detection stimulating data stream is input into the automatic driving processing module as the input data stream, so as to generate a processing result of the fault detection stimulating data stream.

19. The method according to claim 16, further comprising:

periodically setting the control signal such that the fault detection stimulating data stream is input into the automatic driving processing module, so as to generate a processing result of the fault detection stimulating data stream.

20. The method according to claim 16, further comprising:

receiving the processing result of the automatic driving data stream from the automatic driving processing module; and setting the control signal in response to the determining that a fluctuation of the processing result of the automatic driving data stream exceeds a threshold, so as to input the fault detection stimulating data stream into the automatic driving processing module to generate a processing result of the fault detection stimulating data.

\* \* \* \* \*